United States Patent [19]
Rigby et al.

[11] 3,970,926
[45] July 20, 1976

[54] METHOD AND APPARATUS FOR MEASURING THE GROUP DELAY CHARACTERISTICS OF A TRANSMISSION PATH

[75] Inventors: Peter Anthony Rigby, Linlithgow; Ralph Hodgson, Easter Pitcorthie; David Hubert Guest, Balerno, all of Scotland

[73] Assignee: Hewlett-Packard Limited, South Queensferry, Scotland

[22] Filed: Feb. 21, 1975

[21] Appl. No.: 551,819

[30] Foreign Application Priority Data
June 3, 1974 United Kingdom............... 24572/74

[52] U.S. Cl................................................ 324/57 R
[51] Int. Cl.²......................................... G01R 27/00
[58] Field of Search .......... 324/57 R, 57 DE, 83 D; 307/232; 328/133

[56] References Cited
UNITED STATES PATENTS

| | | | |
|---|---|---|---|
| 3,414,809 | 12/1968 | Hoffmann et al.................. | 324/57 R |
| 3,573,611 | 1/1969 | Bergemann........................ | 324/57 R |
| 3,913,011 | 10/1975 | Hughes et al..................... | 324/57 R |

*Primary Examiner*—Stanley T. Krawczewicz
*Attorney, Agent, or Firm*—Roland I. Griffin; Allston L. Jones

[57] ABSTRACT

A method and an apparatus for measuring group delay characteristics of a transmission path is disclosed wherein a test signal is fed to the input of the transmission path and the test signal is amplitude modulated by a split frequency. The carrier frequency of the test signal is interchanged periodically between a measuring frequency and a standard reference frequency. The output measuring and reference signals of the transmission path are sensed by noting the positions in time of specified points of the envelope waveform that occur during the periods of the reference type signal and the measurement type signal. A digital pulse counter is provided for measuring a first time interval between a specified point during a period of a first type signal and a specified point during the subsequent period of the second type of signal, and for measuring a second time interval between the latter specified point and a specified point during the subsequent period of the first type of signal. The pulse counter is bidirectional and is reversed at the end of the first time interval. The counter state at the termination of counting represents the difference between the first and the second time intervals and thus the group delay to be measured.

23 Claims, 8 Drawing Figures

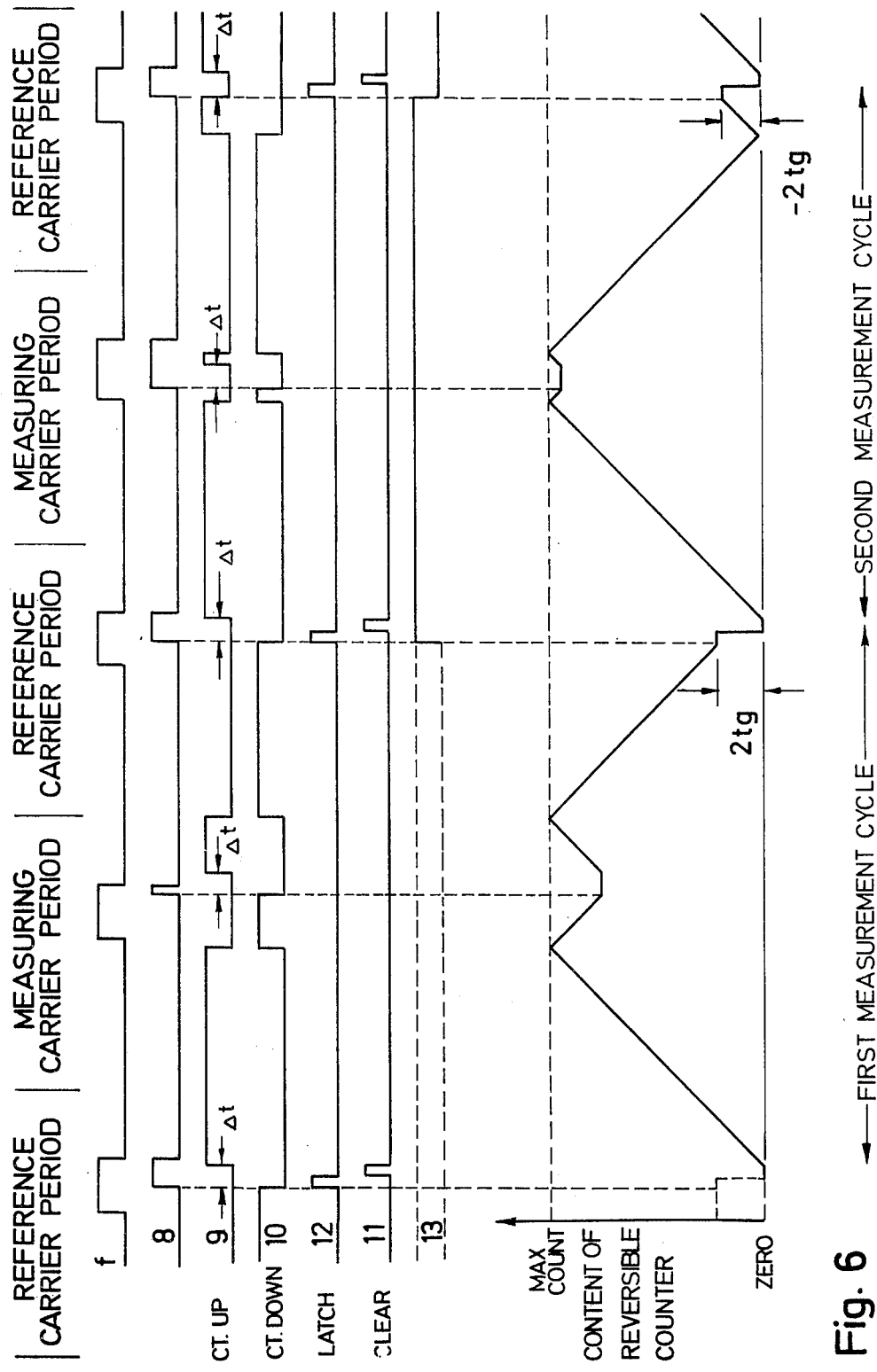

METHOD AND APPARATUS FOR MEASURING THE GROUP DELAY CHARACTERISTICS OF A TRANSMISSION PATH

CROSS REFERENCE TO RELATED APPLICATION

This application is related to the copending U.S. patent application filed on Feb. 21, 1975, as Ser. No. 551,878 entitled "Circuit Arrangement for the Measurement of Group Delay and Attenuation Distortions" now abandoned and refiled as a continuation U.S. patent application on Oct. 14, 1975, as Ser. No. 622,297 for the same assignee as this application.

BACKGROUND OF THE INVENTION

This invention relates to the measuring of the difference in group delay suffered by a signal envelope of a swept measuring carrier frequency with regard to the group delay suffered by a signal envelope of a preferably fixed reference carrier frequency after both signal envelopes have been passed through the same transmission path. Such measurements of frequency dependent group delay distortions are performed over the interesting range of transmitting frequencies of communication paths in order to obtain a measure for the transmission quality and any disturbances, such as cross talk, because of unwanted intermodulations in frequency modulated multiplex communication channels.

Group delay $t_g$ is defined as $t_g = db/d\Omega$, where $b$ is the phase shift of a signal component of the frequency $\Omega$ passed through a transmission path. Virtually all known group delay measuring arrangements are based on the method disclosed by H. Nyquist and S. Brand in "Measurements of Phase Distortion," Bell System Techn. Journal 9 (1930), page 522. According to this method the amplitude of a signal with a carrier frequency $\Omega$ is modulated by a "split" frequency $\omega$, where $\omega$ is substantially smaller than $\Omega$ so that a carrier signal with an envelope of the frequency $\omega$ is generated. This composed signal is passed through a transmission path and is then demodulated to recover said envelope. The phase shift $b$ of this envelope signal is compared to a reference phase derived from the input signal. Then the measured phase shift $\Delta b$ has to be scaled to $\Delta\Omega$ which, as the theory shows, is $\omega$.

According to the German patents 1 025 072 and 1 050 441 the phase measurement according to the Nyquist method can be further modified in that the amplitude modulated measuring carrier signal and a reference carrier signal are applied to the item under test in a periodically alternating sequence at a given change-over frequency and the reference carrier is, during a part of its period, modulated by an identification signal. The measurement and reference signals are demodulated and alternately applied to a phase sensitive detector. The other input of the phase detector is fed from a voltage controlled oscillator connected in a phase lock loop to the detector output via filter means. Thus, the phase of the oscillator is adjusted to the average phase value of the alternating detector input signals.

According to German Pat. No. 1 294 547, which corresponds to U.S. Pat. No. 3,414,809, all auxiliary frequencies required at the transmitting end, namely the split frequency, the indentification frequency and the change-over frequency are derived from a single oscillator and all auxiliary frequencies required at the receiving end, namely the indentification frequency, the change-over frequency and the reference signal are derived from the single frequency controlled oscillator in fixed phase relationship to the received demodulated split frequency as this oscillator is connected in a phase lock loop to the phase detector output. Thereby, the accuracy of the phase measurement is improved.

SUMMARY OF THE INVENTION

The present invention provides a device for measuring frequency dependent group delay distortions of a transmission line. This device performs these measurements by an accurate digital method that is different from the Nyquist phase measuring method and its related modifications.

In the illustrated embodiments of the invention, a test signal is applied to one end of the transmission line to be measured and a receiver that embodies the present invention is connected to the other end of the transmission line. The test signal consists of a carrier with a frequency that is interchanged periodically between a measuring frequency and a reference frequency. The carrier is also amplitude modulated by a split frequency signal. This test signal is received at the other end of the transmission line where the present invention measures the group delay distortion of the signal created by the electrical characteristics of the transmission line under test.

In one embodiment of the invention, a time position for each of a plurality of specified points are detected in the demodulated received test signal waveform. In the simplest case four specified points are detected, e.g. a first specified point during a first measuring carrier period of the demodulated test signal, a second specified point during a first reference carrier period of the demodulated test signal, a third specified point during a second period reference carrier period of the demodulated test signal, and a fourth specified point during a third period measuring carrier period of the demodulated test signal. The first and the second specified points define a first time interval, and the third and the fourth specified points define a second time interval. The group delay of the transmission line is measured using these two time intervals. A high frequency clock and an up/down counter are used to subtract the number of clock pulses that occur during one of the two time intervals from the number of clock pulses that occur during the other of the two time intervals. The resultant number of clock pulses remaining in a storage register of the up/down counter at the completion of the desired measurement cycle represents a multiple of the group delay time.

In another embodiment of the invention, a predetermined time interval representative of a zero difference in the group delay of the transmission path at the measuring and reference carrier frequencies is stored in a digital register. A second time interval is determined from the received signal between a first and second specified point as discussed above. These specified points on the received signal are selected such that the time interval between them will be identical in length for a zero group delay to the predetermined zero difference time interval. Digital circuitry is then used to obtain the difference between these two time intervals and the resultant quantity represents a multiple of the transmission line group delay time.

In either of the above embodiments of the present invention repeated measurements can be made easily to obtain an average of the group delay time. When such repeated measurements are made, the final contents of the counter will automatically indicate a measure of the average value of the group delay time.

BRIEF DESCRIPTION OF THE DRAWINGS

FIG. 6 is a detailed signal sequence diagram illustrating the measuring method performed by the measuring device according to FIGS. 4 and 5.

DESCRIPTION OF THE PREFERRED EMBODIMENT

Figure 1:
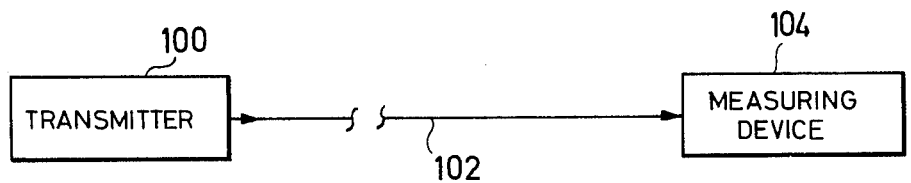
FIG. 1 illustrates a system in which the invention is embodied.

With reference to FIG. 1, the measuring system comprises a transmitter 100 connected to an input of a transmission path 102 whose group delay characteristics are to be measured and a receiver or measuring device 104 connected to the output of the transmission path for receiving the test signal and carrying out measurements upon it. The transmitter generates a test signal comprising a carrier whose frequency is interchanged periodically between a reference frequency and a measuring frequency, the carrier being amplitude modulated by a split frequency. In addition, the carrier is amplitude modulated with an identification frequency during selected portions of the periods of the reference frequency. The transmitter may take any conventional form or, preferably, it is as described in the copending U.S. patent application entitled "Circuit Arrangement for the Measurement of Group Delay and Attenuation Distortions" that was filed for the same assignee on the same day as this application.

Figure 2:
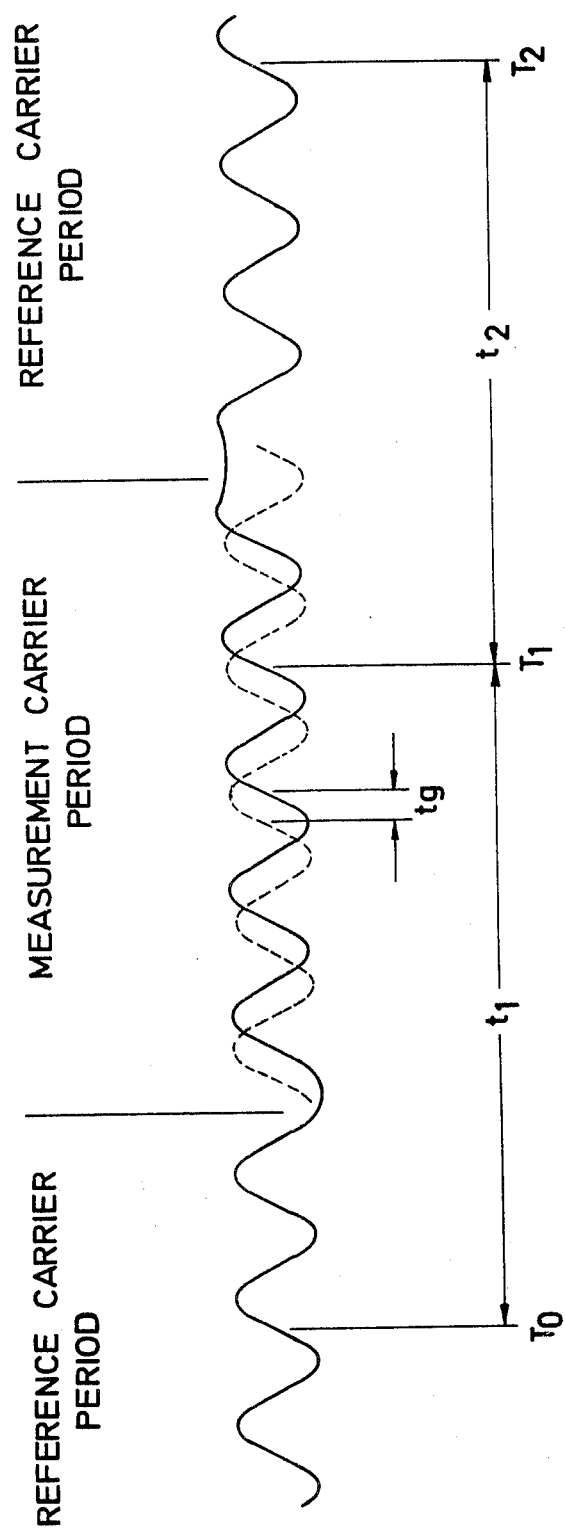
FIG. 2 is a waveform diagram illustrating how the envelope of an amplitude modulated signal is shifted by virtue of a group delay difference.

Referring now to FIG. 2 there is shown the received test signal after demodulation, optional logarithmic conversion, and filtering. The relative groupdelay of the network under test may be measured directly by noting a relative time displacement of the signal in either the reference or measurement carrier period with respect to the two adjacent periods. This is achieved by noting the positions in time $T_0$, $T_1$, $T_2$ etc. of points of equal voltage that occur during the reference and measurement periods. By measuring the time interval $t_1$ from point $T_0$ of the signal during the reference period to a point $T_1$ during the next following measurement period, and then the time interval $t_2$ from the same point $T_1$ in the measurement period to the point $T_2$ in the following reference period, the group delay $t_g$ may be computed from the difference.

$$\text{Thus: } t_g = \frac{(t_1 - t_2)}{2}$$

These time intervals may be measured using a digital technique incorporating a bidirectional counter and a high frequency clock. During the time interval $t_1$ the bidirectional counter is made to count up the pulses from the high frequency clock, then during the following interval $t_2$ the counter is made to count down using the same clock. The contents of the counter at the end of the time interval $t_2$ is dependent on the difference between $t_1$ and $t_2$. Thus a measure of the relative group delay $t_g$ may be obtained. The value obtained for $t_g$ is highly accurate and is independent of any drift, over a relatively long period, in the transmitted envelope frequency. Of course, for this high degree of accuracy to be obtained, the envelope frequency must remain accurately constant during each measuring sequence. The feature that drift of the envelope frequency over relatively long periods does not affect the accuracy of the instrument is an advantage compared to the previously known systems discussed above. In such previous systems, the relative phase of the envelope during measuring and reference periods is detected in a phase detector and scaled to give a reading of group delay; but the output of the phase detector will vary with any variation in the envelope frequency even if the group delay remains constant and thus drift in the envelope frequency would cause inaccuracies in the readings obtained.

Figure 3:
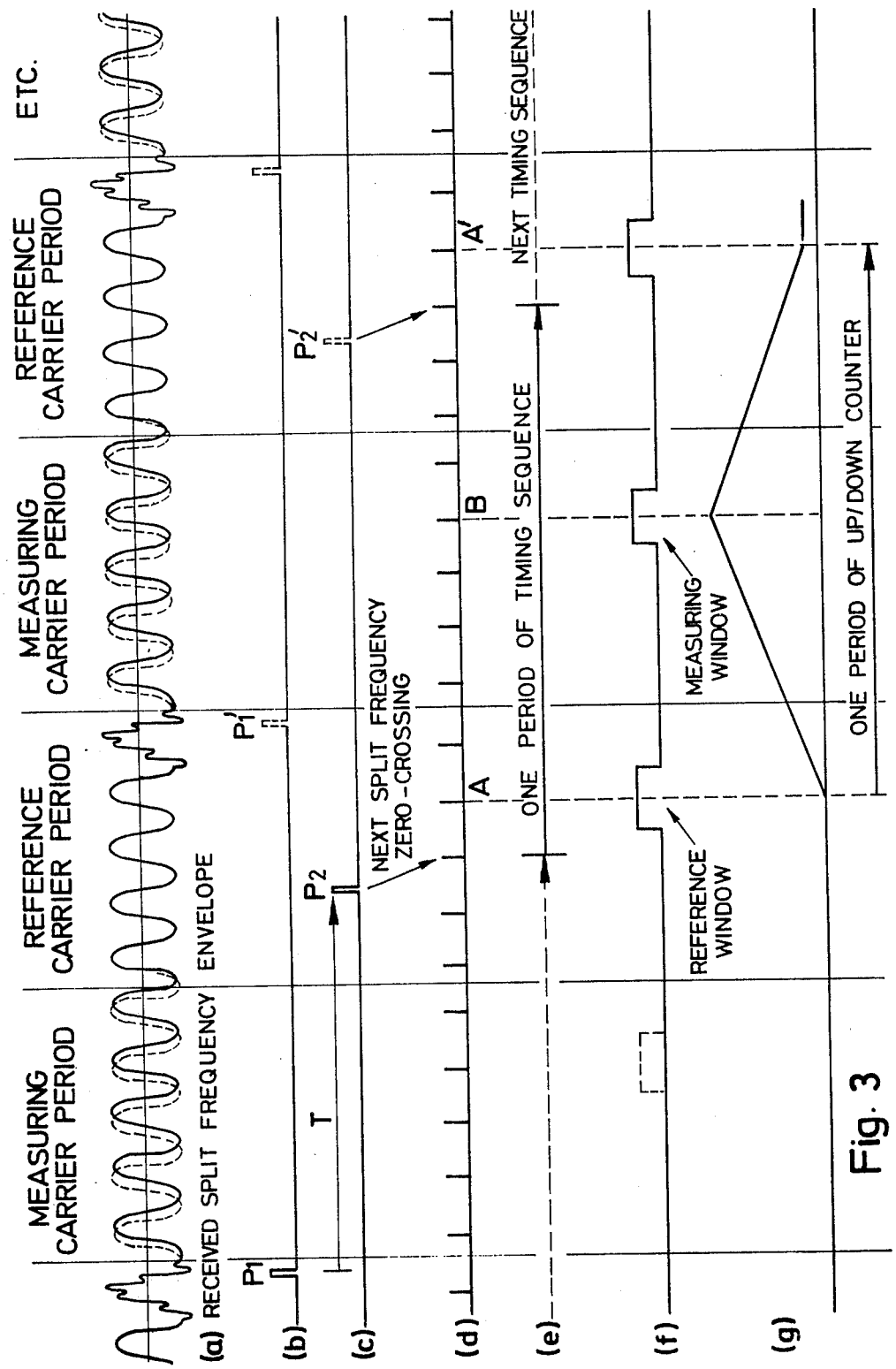
FIG. 3 is a signal sequence diagram illustrating the group delay measuring method according to a preferred embodiment of the present invention.

Referring now to FIG. 3, waveform a shows the demodulated received test signal consisting of a split frequency component and an identification burst at the end of each reference carrier period. If the object under test causes a difference in group delay between the measuring carrier frequency and the reference carrier frequency, then the split frequency (envelope) phase will be displaced in the measuring period with respect to the reference period. The undisplaced position is shown dotted in waveform a. In practice, the envelope will have changes in amplitude as well as in phase, but this is not of importance for this measuring principle.

Waveform d shows pulses corresponding to positive zerocrossing points of the split frequency waveform a. Those pulses may be derived from waveform a by any convenient technique known in the art.

In order to synchronize the receiver to the transmitter, it is necessary to detect the presence of the identification burst at the end of every reference carrier period by means of a device which is responsive to the identification frequency. This device issues pulses $P_1$, $P_1'$, etc. (waveform b) indicating the successful detection of the identification burst. T seconds after $P_1$ another pulse $P_2$ is generated (see waveform c). The duration of T is not of critical importance and need only be approximately correct. Preferably it is selected to place $P_2$ at a position during the reference carrier period where transients caused by the change-over from the measuring carrier period to the reference carrier period have substantially settled. The time interval from $P_1'$ to $P_2'$ is also T, and the same applies to the following pulses. T is preferably generated by counting an appropriate number of clock pulses from the above mentioned high frequency clock, although this time interval could well be determined in other ways of less precision.

The presence of $P_2$ alerts circuitry to look for the next immediately following split frequency zero-crossing in waveform d. This split frequency zero-crossing (whose position need not be precisely known) starts a sequence of timing events which have a period approximately equal to that of the incoming change-over frequency. This period is shown in diagram e. In addition to the signals shown in FIG. 2, a number of other signals may be generated within the period e of FIG. 3 for control of other aspects of the receiver operation. As with T, the position and duration of these signals is not of critical importance but for convenience their positions are determined by counting clock pulses starting at the first zero-crossing after $P_2$.

Not all of the split frequency zero-crossings provide accurate group delay information since the crossings soon after each change-over may be subject to errors in position due to change over transients not having had time to settle. For this reason it is necessary to use only particular zero-crossings in the standard and measurement periods (e.g. A and B respectively) for group delay measurement purposes. Preferably the duration and position in time of the reference windows is selected to cover only one zero-crossing of each reference and measuring carrier period. Those zero-crossings are indicated by A, B, A', etc. in waveform $d$, A, A', etc. thereby being subsequent to that zero-crossing which follows immediately $P_2$, $P_2'$, etc. The position in time of zero-crossing B in the measuring carrier period corresponds to that of A, however, being shifted by the group delay difference to be measured.

Having selected the appropriate split frequency zero-crossings (A, B, A', etc.) the group delay measurement is performed as follows. During the time interval AB a digital counter counts "up" the accurate high frequency clock pulses, and during the time interval BA' the same digital counter counts "down" the accurate high frequency clock pulses. The remainder in the counter at A' represents twice the relative group delay difference. It should also be noted that other time measuring techniques may be used for this purpose, e.g. charging and discharging of a capacitor, however, digital counting is preferred because of its high accuracy.

Normally, identification bursts will be received once every change-over period, and therefore the above-described sequence of events will be continuously repeated. If the generator change-over oscillator and the receiver clock are not each of exactly their nominal frequencies then the zero-crossing following $P_2'$ may not exactly coincide with the end of the previous timing sequence. In this event, the next timing sequence will start at the first zero-crossing following $P_2'$, even if this means slightly shortening or lengthening the previous sequence. In this manner, the receiver timing sequence is maintained approximately in step with the received change-over signal, and it is not necessary to provide a phase-locked relationship between the transmitter frequencies and the receiver clock frequency.

Figure 4:
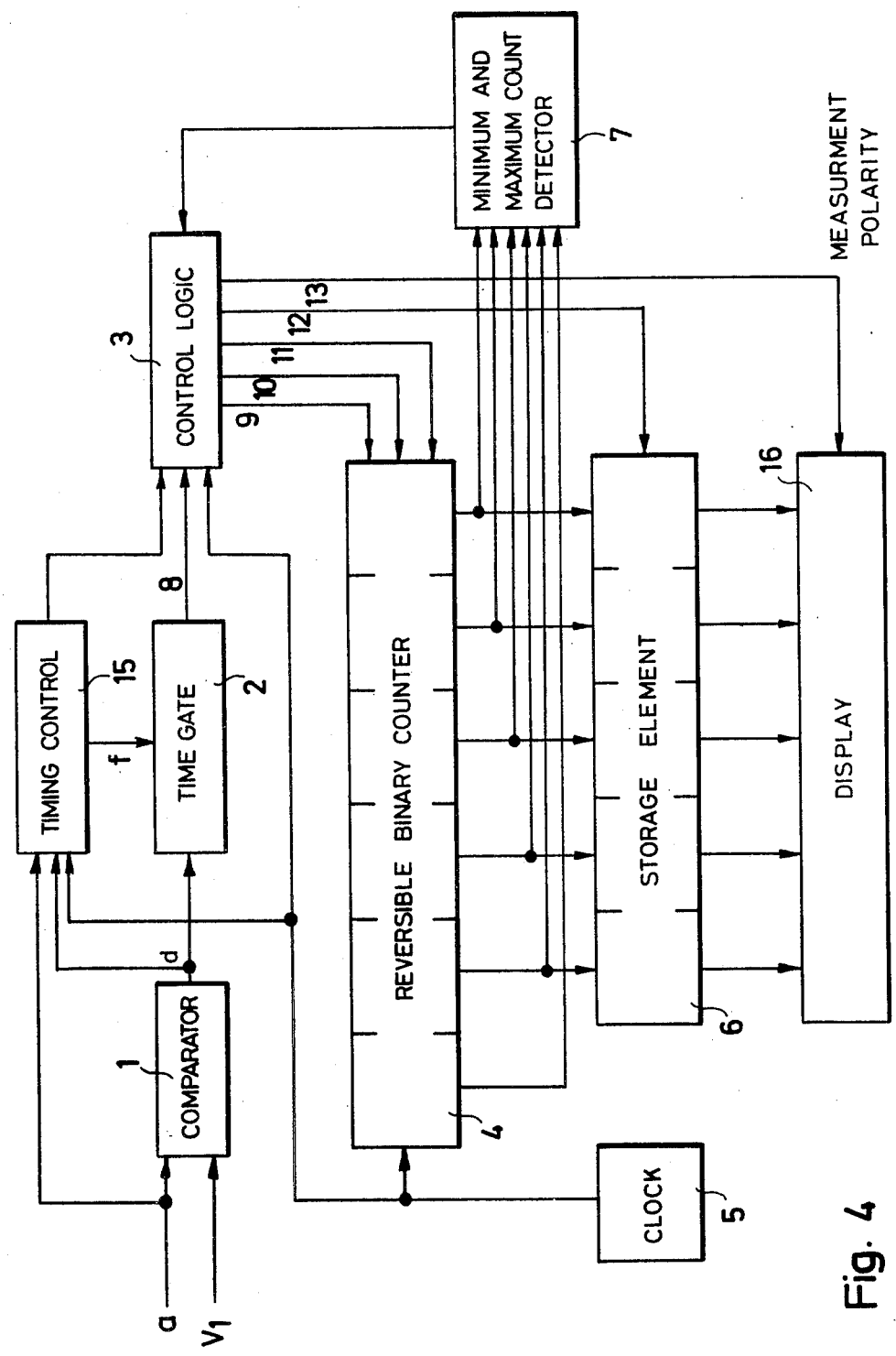
FIG. 4 is a block diagram of a preferred embodiment of a measuring device according to the present invention.

A block diagram of a preferred measuring apparatus is shown in FIG. 4. The signal illustrated in FIG. 2 and indicated by a in FIG. 4 is fed into one input of a voltage comparator 1, the other input being connected to a fixed reference potential $V_1$. This reference potential $V_1$ may be ground. The output of the comparator 1 is the pulse sequence d of FIG. 3 and is connected through a time gate 2 to the counter control logic 3. The timing control signal f provided to the time gate 2 is the above-specified window signal f of FIG. 3 and is issued by a timing control unit 15.

Figure 5:
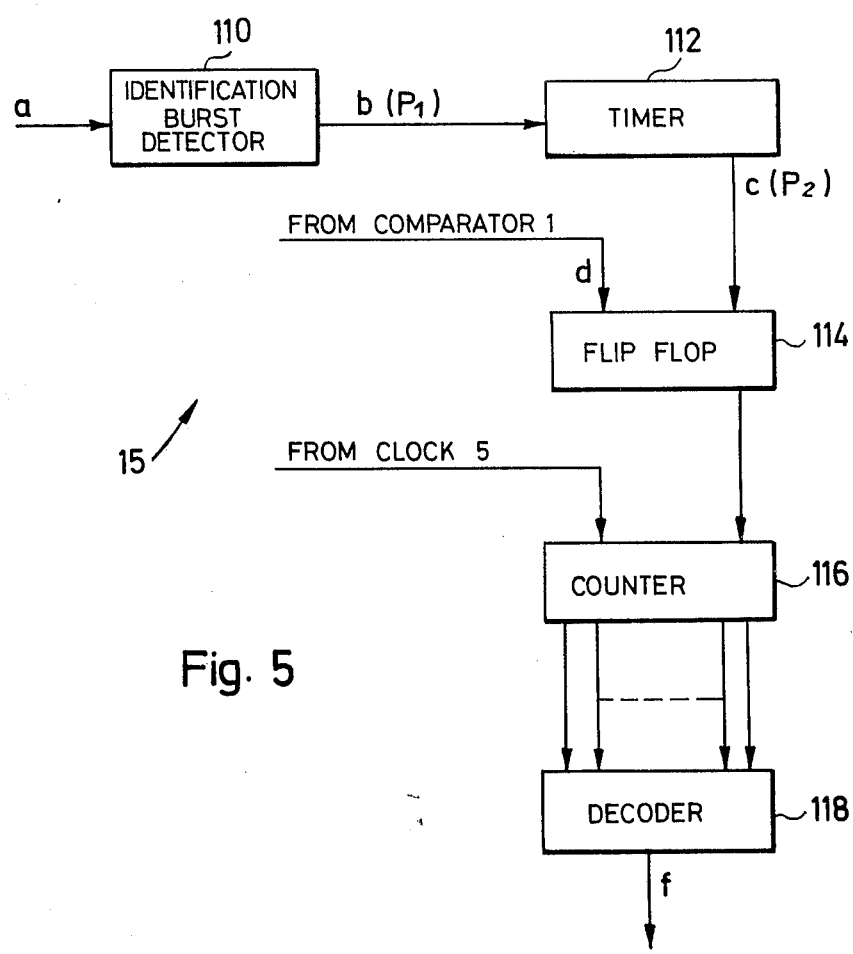
FIG. 5 is a block diagram showing the timing control of the device of FIG. 4 in more detail.

The timing control unit 15 is shown in more detail in FIG. 5. It comprises an identification burst detector 110. This may for example comprise a frequency filter designed to identify the frequency of the burst, which frequency may be such that, for example, there are four or five cycles of identification burst within one cycle of the split frequency. The detector 110 is further operative to produce the pulse $P_1$ of waveform $b$ when a burst is detected. Pulse $P_1$ is applied to a timer 112, for example a monostable circuit, which generates the pulse $P_2$ of waveform c at the end of the time interval T. The circuits 110 and 112 are arranged so that the position in time of the pulse $P_1$ and the length of the interval T result in the pulse $P_2$ being positioned, in time, between zero-crossing points of the split frequency envelope. The pulse $P_2$ is applied to one of the inputs of a flip-flop or bistable circuit 114 and is operative to set the circuit 114. The pulse train d is applied to the other input of the flip-flop 114. Thus, the next pulse in the pulse train d resets the flip-flop 114, this next pulse occurring at the next zero-crossing in the split frequency envelope following the occurrence of pulse $P_2$. The output of the flip-flop 114 is supplied to a counter 116 and causes the counter 116 to begin counting pulses from a clock 5 of FIG. 4 when the flip-flop 114 is reset. The counter is arranged to count up to a predetermined number and then to be reset by means not shown, for example it may count from 1 to 100 and then be reset. A decoder circuit 118 senses the contents of the counter 116 and generates the windows or time slots of waveform $f$ during periods when the contents of the counter have selected values. For example, the reference window of waveform $f$ may be generated when the number in the counter is between 5 and 15 and the measuring window may be generated when the number in the counter is between 55 and 65. Thus, at these times the gate 2 is opened so that the control logic 3 can detect the occurrence of zero-crossing points within the time slots or windows.

The outputs of the counter control logic 3 are a count up command 9, a count down command 10, and a counter clear command 11 which are connected to a bidirectional binary counter 4. A further output is a latch data command 12 which is connected to a storage element 6. A stable high frequency clock 5 feeds a clock signal to the counter 4, to the control logic 3, and to the timing control unit 15. The outputs of the counter 4 are connected to the storage element 6 which feeds an optional digital display 16. A logic circuit 7 is also connected to the counter 4 which detects the minimum count state (all zeros) and the maximum count state (all ones) in the counter 4. The output of this detector 7 is connected to the control logic 3 to reverse signals 9 and 10 so that the count remains within the range of counter 4 during a counting period. This results in a signal foldover described hereinafter. One further output 13 of the control logic 3 gives the polarity of the measurement that is also generated from the output of detector 7. The digital display 16 is connected to both the storage element 6 and the output 13 and displays the measurement result.

The circuit shown in FIG. 4 operates in two modes. In the first mode a single measurement or a continuous series of measurements may be made. A diagram of the timings of the various signals involved is illustrated in FIG. 6. The signals in both FIG. 4 and FIG. 6 have the same reference numerals. Two measurement cycle examples are illustrated, the first yielding a positive group delay reading, and the second a negative reading. Consider the first measurement cycle. Upon the detection of a fixed point on the signal $a_1$ during the first reference carrier period a first pulse 8 is fed to the control logic 3. A short fixed period of time $\Delta t$ after the detection of the pulse 8 the control logic 3 produces a count up command 9. Upon the detection of the fixed point on the phase modulated signal $a_1$ during the following measurement carrier period a second pulse 8 is generated, which causes the control logic 3 to cancel the existing count command and a short fixed period $\Delta t$ later issue a count command of the opposite direction to the preceding count. Again the detection of the fixed point on the signal $a_1$ during the following reference carrier period produces a third pulse 8 which causes the control logic 3 to cancel the existing count command 10. In the ensuing time interval $\Delta t$ the control logic 3 issues a short latch data command pulse 12 which causes the number remaining in the counter 4 to be loaded into the storage element 6, followed by a clear command 11 which causes the number in the counter 4 to be set to zero. At the end of the time delay $\Delta t$ the control logic 3 issues a count up command 9 and a subsequent measurement cycle begins. Note that each time the minimum and maximum count detector 7 is triggered by the counter 4 reaching the all ones state the control logic 3 is forced to cancel the existing count up command and issue a count down command resulting in a count signal foldover as shown in FIG. 6. This enables the apparatus to use a counter 4 whose maximum capacity need only equal or exceed twice the largest group delay to be measured. Since in the first measurement cycle $t_1 > t_2$ (see FIG. 2) the final count state of the counter 4 immediately prior to the latch data command 12 is "count down". This fact is recognized by the control logic which issues a positive measurement polarity signal 13 causing a positive display. The number remaining in the counter 4 at the end of the count down period is proportional to twice the magnitude of the group delay difference and it is preferable to divide it by a factor 2. This is achieved by ignoring the least significant bit in the counter 4 and latching only the remaining bits thus reducing the positional significance of the bits. Note that the group delay measurement resolution is dependent principally on the frequency of the clock 5. Thus, for example 1$\mu$s resolution may be achieved using a 1 MHz oscillator. In addition the measurement accuracy is dependent principally on the frequency accuracy of the clock 5. This may be crystal controlled thus yielding a very high order of accuracy and stability. The measurement of a negative value of group delay difference is illustrated in the second measurement cycle of FIG. 6. This is similar to the first measurement cycle except in that during the period when the counter 4 is counting down the minimum and maximum count detector 7 produces an output if the contents of the counter 4 reaches the all zeros state, thus causing the control logic 3 to cancel the count down command 10 and issue a count up command 9, again resulting in a count signal foldover. Since at the end of the second measurement cycle the final count state prior to the latch data command 12 was "count up" (because $t_1 < t_2$) the control logic 3 produces a negative measurement polarity signal 13.

Figure 7:
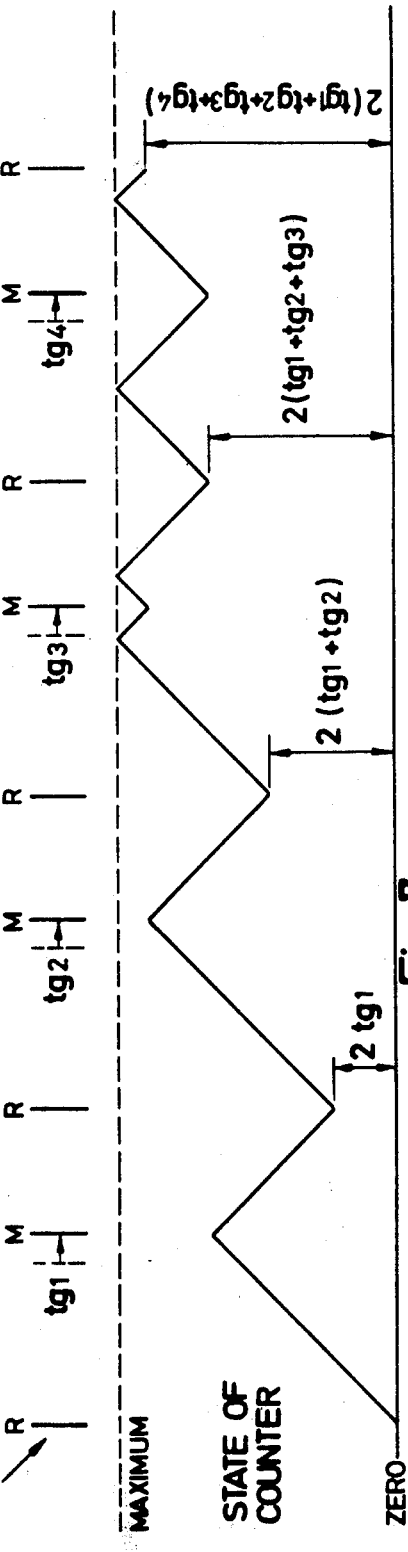
FIGS. 7 and 8 are counter state diagrams illustrating a modified method of group delay measurement.
Figure 8:
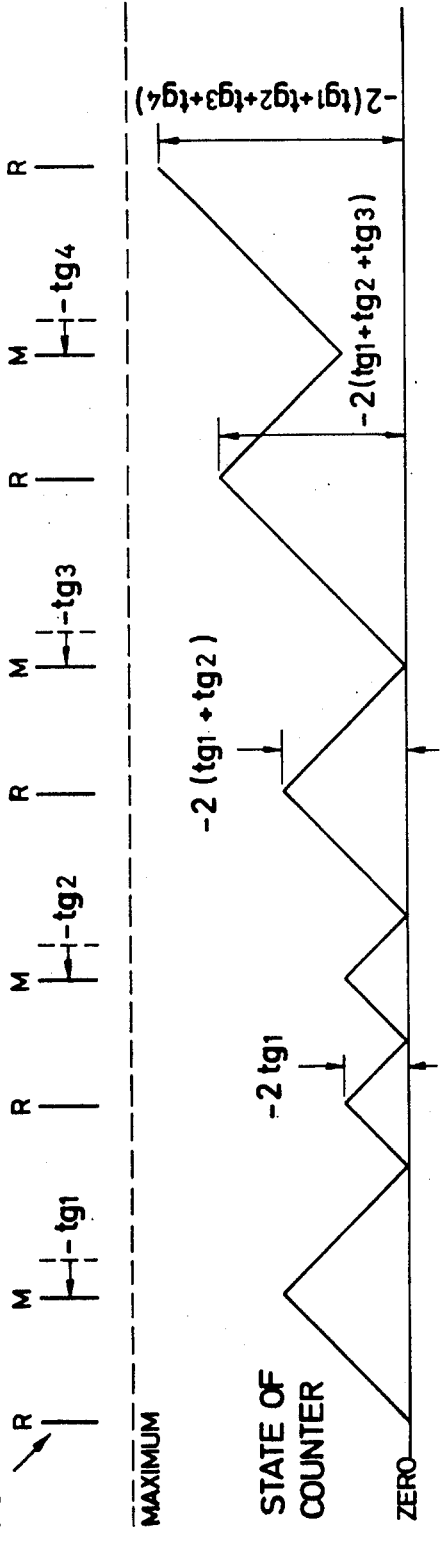

In the second mode of operation the circuit performs the summation and averaging of a number of consecutive measurements. This is shown in FIGS. 7 and 8. The operation of the control logic is changed slightly as follows. At the start of a summation the first fixed point R on the phase modulated signal $a_1$ during a reference carrier period causes the control logic 3 to issue a count up command 9. Thereafter, every time a fixed point R or M on the phase modulated signal $a_1$ is detected, the control logic 3 reverses the direction of count. In addition every time the all zeros or the all ones state in the counter 4 is detected by the minimum and maximum count detector 7 the control logic 3 forces the counter to reverse modes into the count up or count down mode respectively, resulting in a count signal foldover. This process continues until the end of the last measurement in the summation when the detection of the fixed point R on the phase modulated signal $a_1$ during the reference period causes the control logic 3 to stop the count before issuing a latch data command 12. The number in the counter is now proportional to twice the summation of the number of measurements made.

For N successive measurements:

$$\text{the counter contents} = 2\sum_{n=1}^{N}(t_{gn})$$

where $t_{gn}$ is the value of each individual group delay measurement. Note that the maximum capacity of the counter 4 must be increased to $2N \cdot t_{gm}$ where $t_{gm}$ is the largest value of group delay difference to be measured. FIGS. 7 and 8 show the state of the counter during the summation of four positive measurements and four negative measurements respectively. Note how the direction of count always reverses when a fixed point on the signal $a_1$ is detected and when the contents of the counter 4 reaches the all zeros and the all ones state.

In order to obtain the average of a series of measurements the contents of the counter 4 must preferably be divided by 2N (where N is the number of successive measurements). For example if N is a power of 2 this can be easily achieved by replacing the storage element 6 by a shift register. Upon receipt of the latch command 12 the number in the counter 4 can then be loaded in parallel into the shift register and shifted the appropriate number of times in the direction of the least significant bit to perform the division. As in the first mode of operation the final count state of the counter 4 immediately prior to the latch command 12 sets the control logic 3 to issue the correct measurement polarity signal, a positive signal if the count mode was "down" and a negative signal if the count mode was "up."

Although precedingly the invention has been described with a view to the measurement of group delay distortions, its possible implication is significantly broader: wherever the problem arises to measure the relative time delay between time or phase shifted periodic signals of basically the same waveform and frequency, which are only available in a periodically alternating sequence (i.e. which are not simultaneously available), the inventive principle of subtracting subsequent time periods and thereby correlating phase information obtained from subsequent sections of both signal waveforms to be compared will be useful. Especially were stochastic signals are handled and thus the problem of statistic signal processing arises, the use of an up/down counter for averaging the results obtained over several periods is highly useful.

Various modifications are possible within the scope of the invention. For example, although in the embodiment described with reference to the drawings, the counter 4 has been shown to begin to count down immediately the point b is detected, that is to say the second time interval measured by the counter begins immediately the first time interval measured thereby ends, this is not essential. If desired, there could be a space in time between the end of the first time interval and the beginning of the second by making suitable modifications to the circuit, that is to say the second time interval would begin during a subsequent measuring carrier period instead of that in which the first time interval ends. Further, the beginning and end of each time interval have been shown in the drawings to be located in immediately adjacent reference and measuring carrier periods; however, this is not essential and, if desired, the apparatus could be modified so that there are one or more intervening measuring and/or carrier periods between the beginning and end of each measured interval. This could be achieved by spacing more widely the reference and measuring windows.

Furthermore, although in the preferred embodiment the delay $t_g$ is measured by measuring a first time interval between a specified point in a reference carrier period of the demodulated test signal and a specified point in a following measuring carrier period of the demodulated test signal, and then subtracting from the result the time interval between the specified point in the measuring carrier period of the demodulated test signal and a specified point in a subsequent reference carrier period of the demodulated test signal, it is possible within the scope of the invention to measure $t_g$ by other means. For example, instead of carrying out these two measurements and subtracting them, the receiver could be provided with a register in which the value that the time period $t_1$ would have if $t_g$ is zero is stored and then the measured value of $t_1$ could be compared with the stored value to determine $t_g$. However, if inaccuracy is to be avoided with this method, the transmitter should itself be highly accurate whereas a high degree of accuracy is not required in the method illustrated in the drawings in which $t_1$ and $t_2$ are both measured at the receiver and subtracted from one another.

We claim:
1. A method of measuring group delay characteristics of a transmission path, comprising the steps of:
   a. feeding a test signal to the input of a transmission path, the test signal including a carrier with a frequency that is interchanged periodically between a measuring frequency and a reference frequency, the carrier being amplitude modulated by a split frequency during both carrier periods;
   b. receiving the test signal from the output of the transmission path;
   c. demodulating the received test signal;
   d. sensing in the demodulated test signal a plurality of specified points, said specified points including:
      a first specified point in any period of a first of the reference and measuring carrier periods of the demodulated test signal;
      a second specified point in a selected period of a second of the reference and measuring carrier periods of the demodulated test signal;
      a third specified point in a selected period of the second of the reference and measuring carrier periods of the demodulated test signal; and
      a fourth specified point in a selected period of the first of the reference and measuring carrier periods of the demodulated test signal;
   e. measuring a first time interval between the first and second specified points;
   f. measuring a second time interval between the third and fourth specified points; and
   g. deriving said group delay characteristics from the measured first and second time intervals, the first and second time intervals being digitally measured by a pulse counter.

2. The method according to claim 1, wherein the steps of measuring said time intervals and deriving the group delay characteristic further comprises the steps of:
   a. measuring the first time interval between the first specified point during any period of the first of the reference and measuring carrier frequency periods of the demodulated test signal and the second specified point during the next following period of the second of the reference and measuring carrier frequency periods of the demodulated test signal;
   b. measuring the second time interval between the third specified point during the selected period of the second of the reference and measuring carrier frequency periods of the demodulated test signal and the fourth specified point during the next following period of the first of the reference and measuring frequency carrier periods of the demodulated test signal;
   c. obtaining the difference between the first and second time intervals; and
   d. dividing the time interval difference by a factor of two to obtain said group delay time characteristic.

3. The method according to claim 2, wherein the second and third specified points occur in the same period of the second of the reference and measuring carrier frequency periods of the demodulated test signal.

4. The method according to claim 3, wherein the first, second, third, and fourth specified points occur in three adjacent periods of the reference and measuring carrier frequency periods of the demodulated test signal.

5. The method according to claim 3, wherein the second and third specified points are coincident.

6. The method according to claim 1, wherein the steps of measuring the time intervals and determining the group delay characteristic further comprises the steps of:
   a. storing a predetermined time interval representative of a zero difference in the group delay of the transmission path during the measuring and reference carrier frequencies;
   b. obtaining the difference between one of the two measured time intervals and the stored predetermined time interval; and
   c. deriving a representation of said group delay characteristic from the difference by dividing by an appropriate factor.

7. The method according to claim 2, wherein the measured time interval obtained at each repetition is alternately summed and subtracted from the previously obtained sum of the measured time intervals, thereby obtaining a measure of the average group delay over the total time period during which the method is repeated.

8. Apparatus for measuring group delay characteristics of a transmission path, said apparatus comprising:
   a high frequency digital clock;
   means for feeding a test signal to the input of a transmission path, the test signal including a carrier with a frequency that is interchanged periodically between a measuring frequency and a reference frequency, the carrier being amplitude modulated by a split frequency during both carrier periods;

means for receiving the test signal from the output of the transmission path;

means for demodulating the received test signal;

means for sensing in the demodulated test signal a plurality of specified point, said specified points including:

a first specified point in any period of a first of the reference and measuring carrier periods of the demodulated test signal;

a second specified point in a selected period of a second of the reference and measuring carrier periods of the demodulated test signal;

a third specified point in a selected period of the second of the reference and measuring carrier periods of the demodulated test signal; and a fourth specified point in a selected period of the first of the reference and measuring carrier periods of the demodulated test signal;

means for measuring a first time interval between the first and second specified points;

means for measuring a second time interval between the third and fourth specified points; and means for deriving said group delay characteristics from the measured first and second time intervals, the first and second time intervals being digitally measured by a pulse counter.

9. Apparatus according to claim 8, wherein means for sensing said specified points and means for measuring said time intervals further comprises:

means for measuring the first time interval between the first specified point during any period of the first of the reference and measuring carrier frequency periods of the demodulated test signal and the second specified point during the next following period of the second of the reference and measuring carrier frequency periods of the demodulated test signal;

means for measuring the second time interval between the third specified point during the selected period of the second of the reference and measuring carrier frequency periods of the demodulated test signal and the fourth specified point during the next following period of the first of the reference and measuring carrier frequency periods of the demodulated test signal; and means for obtaining the difference between the first and second time intervals to derive a representation of said group delay characteristic by dividing the time interval difference by a factor of two.

10. Apparatus according to claim 9, wherein the second and third specified points occur in the same period of the second of the reference and measuring carrier frequency periods of the demodulated test signal.

11. Apparatus according to claim 10, wherein the first, second, third, and fourth specified points occur in three adjacent periods of the two carrier frequency periods of the demodulated test signal.

12. Apparatus according to claim 10, wherein the second and third specified points are coincident.

13. Apparatus according to claim 9, wherein the means for sensing the specified points is operative such that the time difference between the first and second time intervals is zero in the event that the group delay at the reference frequency is the same as the group delay at the measurement frequency, said time difference thereby being a measure of the difference in the group delay of the transmission path at the measuring and reference frequencies.

14. Apparatus according to claim 9, wherein said means for measuring time intervals comprises pulse counter means arranged to count clock pulses, said pulse counter means being bidirectional to allow the reversal of the counting direction of the counter so as to subtract clock pulses counted during one of the first and second time intervals from the clock pulses summed during the other of the first and second time intervals so that the number stored in the counter at the termination of the counting sequence is representative of the time difference between the first and second time intervals.

15. Apparatus according to claim 14, wherein the pulse counter means includes means for determining the direction of counting immediately prior to the termination thereof and to provide therefrom a signal designating the polarity of the resultant time difference.

16. Apparatus according to claim 8, wherein the means for measuring the time intervals and the means for deriving said group delay characteristic further comprises;

means for storing a predetermined time interval representative of a zero difference in the group delay of the transmission path during the measuring and reference carrier frequencies; and means for obtaining the difference between one of the two measured time intervals and the stored predetermined time interval to derive a representation of said group delay characteristic from the time difference.

17. Apparatus according to claim 9, that further comprises:

means for detecting an identification signal provided in the test signal during periods of one of the reference and measuring carrier frequency periods;

means for defining time slot signals responsive to said identification signal detection means; and means for sensing the specified points within the time periods identified by the time slot signals.

18. Apparatus according to claim 17, wherein the means for defining time slot signals is operable in response to a first signal from the means for detecting the identification signal to define a first and a second time slot signal spaced apart from one another by a predetermined time, and a second signal from the means for detecting the identification signal to define a third and a fourth time slot signal.

19. Apparatus according to claim 18, wherein the means for defining time slot signals comprises:

a pulse counter operable to count clock pulses; and a decoder to sense the contents of the counter to generate time slot signals during periods when the contents of the counter are predetermined values.

20. Apparatus according to claim 19, wherein the decoder is designed to generate a first of said time slot signals during the next plus one carrier frequency period of the demodulated test signal following detection of the identification signal.

21. Apparatus according to claim 17, wherein the means for sensing the specified points includes:

a comparator that receives the demodulated test signal and a reference voltage, and that is operable to produce a pulse each time the positive sloping edge of the demodulated test signal waveform exceeds a predetermined level defined by the reference voltage; and a time gate that receives the pulses from the comparator and that is opened only during the time slot signals so that one of the comparator pulses may pass the gate during each time slot signal, said pulses being passed individually by the gate to identify the specified points.

22. Apparatus according to claim 20 operable to obtain a new group delay characteristic measurement with each pair of measured time intervals by resetting said pulse counter after each pair of measured time intervals.

23. Apparatus according to claim 9, wherein the output of the time interval measuring means is alternately summed and subtracted from the previously obtained sum of the measured time intervals, thereby obtaining a representative of the average group delay over the total time period during which the measurement is repeated.

\* \* \* \* \*